United States Patent [19]
Waybright et al.

[11] 3,758,812
[45] Sept. 11, 1973

[54] ISOLATED HORIZONTAL AND VERTICAL OUTPUT CIRCUITRY HAVING A COMMON WINDING

[75] Inventors: George Cleveland Waybright, Oakfield; William Elias, Batavia, both of N.Y.

[73] Assignee: GTE Sylvania Incorporated, Seneca Falls, N.Y.

[22] Filed: Apr. 19, 1972

[21] Appl. No.: 245,321

[52] U.S. Cl. .............................. 315/27 XY, 335/213
[51] Int. Cl. .............................................. H01j 29/70
[58] Field of Search ................ 335/213; 315/27 GD, 315/27 R, 27 TD, 27 XY

[56] References Cited

UNITED STATES PATENTS

| | | | |
|---|---|---|---|
| 3,648,099 | 3/1972 | Otten et al. | 315/27 GD |
| 3,688,156 | 8/1972 | Utsunomiya et al. | 315/27 GD |
| 3,501,672 | 3/1970 | Xenakis | 315/27 TD |
| 2,598,303 | 5/1952 | Reinhard | 315/27 XY |
| 3,622,835 | 11/1971 | Parker | 315/27 XY |

*Primary Examiner*—Carl D. Quarforth
*Assistant Examiner*—J. M. Potenza
*Attorney*—Norman J. O'Malley, Thomas H. Buffton et al.

[57] ABSTRACT

Horizontal output circuitry for a cathode ray tube system includes a deflection yoke associated with the cathode ray tube and having horizontal, vertical, and common windings. An electron device is coupled via a first portion of a split winding of a transformer to a potential source and via a second portion to a potential reference level while a charge storage means couples each of the first and second portions of the split winding to first and second horizontal deflection windings connected to the common windings formed into a bridge configuration.

6 Claims, 1 Drawing Figure

PATENTED SEP 11 1973 3,758,812
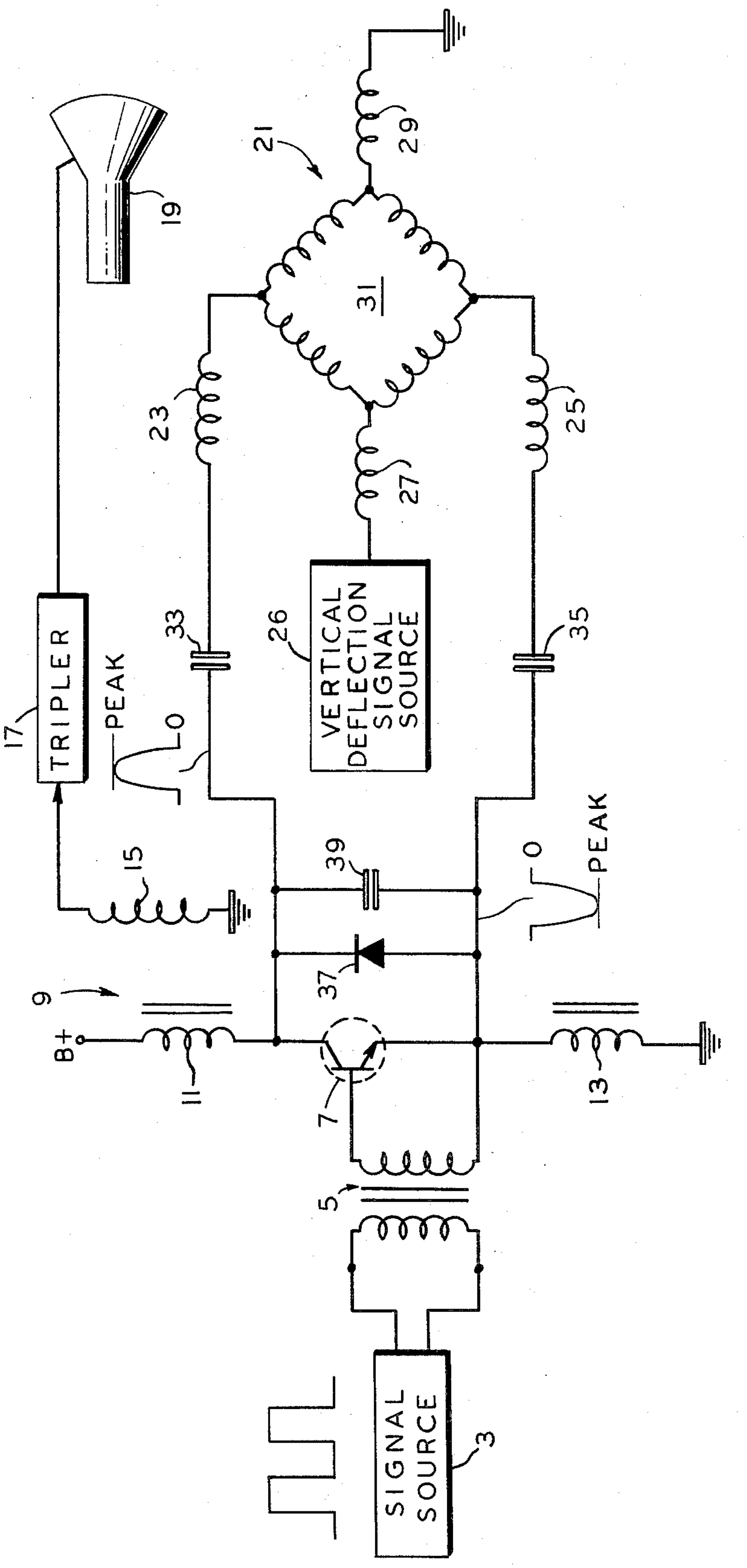

ISOLATED HORIZONTAL AND VERTICAL OUTPUT CIRCUITRY HAVING A COMMON WINDING

CROSS-REFERENCE TO OTHER APPLICATIONS

A co-pending application entitled "Horizontal Output Circuitry for Cathode Ray Tube System" filed Mar. 6, 1972 and having Ser. No. 232,123, relates to horizontal output circuitry having a transformer with a split primary winding for reducing the potential magnitude applied to interleaved windings of a deflection yoke.

BACKGROUND OF THE INVENTION

Generally, cathode ray tube systems include a cathode ray tube having a deflection yoke associated with the cathode ray tube for effecting electron beam deflection in both horizontal and vertical directions. In turn, this horizontal and vertical deflection is effected by horizontal and vertical circuitry coupled to the horizontal and vertical deflection windings of the deflection yoke.

Usually, the horizontal deflection circuitry includes a horizontal output tube or electron device and a horizontal output transformer with primary and secondary windings. The output device is coupled to a potential reference level or circuit ground and via the primary winding to a potential source. A series connected storage capacitor and first and second horizontal deflection windings of the deflection yoke are shunted across the output device and in parallel connection with a damper diode and capacitor. Moreover, the secondary winding of the transformer is coupled to the cathode ray tube via a high voltage development circuit.

In operation, the storage capacitor is charged to a potential approximately equal to the potential source while the horizontal output device is in a non-conductive condition. Upon application of a proper signal to the output device, a transient period of conduction to non-conduction of the output tube in conjunction with the inductive kick of the horizontal deflection windings causes development of a relatively high flyback pulse potential across the series connected horizontal deflection windings of the deflection yoke.

Although the above-described circuitry is widely employed, it has been found that such horizontal circuitry leaves something to be desired in certain apparatus. For example, the apparatus employed in the cross-referenced application includes a toroid yoke with interleaved horizontal and vertical windings wherein corona and insulation failures are normally a problem. However, a transformer with a split primary winding is employed whereupon horizontal circuit configuration was necessarily altered and a reduced potential of substantially equal and opposite polarity developed across each one of a pair of horizontal deflection windings.

Additionally, apparatus alterations require further adjustments in the attendant circuitry. For instance, it has been found that a toroid-wound yoke having interleaved horizontal, vertical, and common windings in a bridge configuration is a particularly suitable way of decreasing the resistance of the yoke which, in turn, provides a better inductance to resistance ratio. Thus, an improved inductance to resistance ratio enhances the overall linearity and temperature capabilities of the yoke. Moreover, it has been found that common windings employed in a deflection yoke have a tendency toward corona and insulation failure problems and, more importantly, require circuitry for isolating the horizontal and vertical drive circuits from one another.

OBJECTS AND SUMMARY OF THE INVENTION

An object of the present invention is to provide enhanced horizontal deflection circuitry for a cathode ray tube system employing a deflection yoke having horizontal, vertical, and common windings. Another object of the invention is to provide unique horizontal deflection circuitry suitable for use with a deflection yoke having horizontal, vertical, and common deflection windings. Still another object of the invention is to provide horizontal deflection circuitry for effecting improved isolation of horizontal and vertical circuits of a deflection yoke having common windings.

These and other and further objects, advantages, and capabilities are achieved in one aspect of the invention by horizontal deflection circuitry for a cathode ray tube system employing a cathode ray tube and associated deflection yoke having horizontal, vertical, and common windings, an electron device coupled by a first portion of a split transformer winding to a potential source and by a second portion to a potential reference level, and a charging circuit means coupling each of the first and second portions of the split transformer winding to one of a pair of horizontal deflection windings connected to the common windings of the deflection yoke.

BRIEF DESCRIPTION OF THE DRAWING

The sole FIGURE illustrates a preferred form of horizontal deflection circuitry for a cathode ray tube system.

PREFERRED EMBODIMENT OF THE INVENTION

For a better understanding of the present invention, together with other and further objects, advantages and capabilities thereof, reference is made to the following disclosure in conjunction with the appended claims and accompanying drawing.

Referring to the drawing, signals from a signal source 3, such as a horizontal oscillator stage for example, are applied to a transformer 5 having a secondary winding coupled to the control electrode of an electron device 7. A horizontal output transformer 9 has a split primary winding with a first portion 11 coupling the output electrode of the electron device 7 to a potential source B+ and a second portion 13 coupling an input electrode of the electron device 7 to a potential reference level such as circuit ground. A secondary winding 15 of the horizontal output transformer 9 is coupled via a voltage tripler 17, for example, to a cathode ray tube 19.

A deflection yoke 21 includes first and second horizontal deflection windings 23 and 25 respectively, a vertical deflection signal source 26 coupled to first and second vertical deflection windings 27 and 29, and common windings 31 in a bridge configuration. The common windings 31 include a first pair of diametrically opposite corners connected to the first and second horizontal deflection windings 23 and 25 and a second pair of diametrically opposite corners connected to the first and second vertical deflection windings, 27 and 29.

A charge circuit means includes a first capacitor 33 coupling the first horizontal deflection winding 23 to the output electrode of the electron device 7 and the first portion 11 of the horizontal output transformer 9. Also, a second capacitor 35 included in the charge circuit means couples the second horizontal deflection winding 25 to the input electrode of the electron device 7 and the second portion 13 of the horizontal output transformer 9. Moreover, a parallel connected damper diode 37 and capacitor 39 are shunted across the input and output electrodes of the electron device 7.

As to operation, the capacitor 33 of the charge storage means assumes a potential substantially equal to the potential source B+ as soon as power is applied to the apparatus. Thereafter, a signal from a signal source 3, a 15.75 kHz horizontal oscillator for example, is applied via a transformer 5 to the electron device 7.

When the signal available from the signal source 3 is of a polarity such that the electron device 7 is shifted to a conductive state, a primary current flows from the potential source B+ via the first winding portion 11, the electron device 7, and the second winding portion 13 of the transformer 9 to circuit ground. Also, deflection yoke current flows through capacitor 33, electron device 7, and capacitor 35. Thus, the potential appearing at the output electrode and at the input electrode of the electron device is substantially one-half the value of the potential source B+.

As the signal applied to the electron device 7 from the signal source shifts, the electron device 7 is suddenly rendered non-conductive. Thereupon, an inductive kick or flyback pulse potential appears at output and input electrodes of the electron device 7. Moreover, as this flyback pulse potential decreases in magnitude, it would tend to reverse polarity and increase in a negative direction or, as is well known, develop a "ringing" current. However, the damper diode 37 immediately shifts to a conductive state whereupon such a negative advance in potential is inhibited.

This conductive state of the damper diode 37 continues until the signal applied to the electron device 7 again shifts. Thus, the initiation of current flow through the electron device 7 is accompanied by discontinuance of current flow by the damper diode 37. Moreover, a shift in the applied signal to effect non-conduction of the electron device 7 is again accompanied by development of a flyback pulse potential or a repeat of the previously described sequence.

Further, it can readily be seen that the common windings 31 in a bridge configuration are utilized by the horizontal and vertical deflection windings, 23, 25, and 27, 29 respectively. Also, it is readily understood that isolation of horizontal from vertical deflection windings is essential to proper operation and deflection of an electron beam of the cathode ray tube 19.

Therefore, a signal applied from a vertical deflection signal source 26 to the first vertical deflection winding 27, usually a 60 Hz signal, would appear at the common windings 31 whereat the first and second horizontal deflection windings 23 and 25 are connected. At this vertical deflection frequency, the first horizontal deflection winding 23 and first capacitor 33 of the charge storage means would appear as a relatively high impedance. Also, the second horizontal deflection winding 25 and second capacitor 35 of the charge storage means would present a relatively high impedance to the vertical frequency signal. Thus, isolation of the horizontal from the vertical deflection circuitry is achieved by the addition of the second capacitor 35 of the charge storage means even though the bridge configuration common windings 31 are utilized in both horizontal and vertical circuitry.

As a result, there has been provided unique horizontal output circuitry especially suitable for use with a cathode ray tube system employing a toroid-wound deflection yoke with interleaved horizontal, vertical, and common windings. A transformer with a split winding is utilized to reduce corona and insulation failure probabilities while a charge storage means is employed to effect isolation of the horizontal and vertical deflection windings.

Further, the system provides lower current flow and, as a result, lower temperatures in the flyback or horizontal output transformer. Moreover, the split winding of the transformer insures a reduced peak to peak voltage in the deflection yoke which enhances the reliability of the apparatus by inhibiting undesired corona development.

While there has been shown and described what is at present considered the preferred embodiment of the invention, it will be obvious to those skilled in the art that various changes and modifications may be made therein without departing from the invention as defined by the appended claims.

What is claimed is:

1. In a cathode ray tube system, horizontal deflection circuitry comprising:
- a cathode ray tube;
- deflection yoke means associated with said cathode ray tube and including first and second horizontal deflection windings, first and second vertical deflection windings, and common windings, said common windings being connected in a bridge configuration with one pair of diametrically opposite corners coupled to one end of each of said first and second horizontal deflection windings and the other pair of diametrically opposite corners coupled to one end of each of said first and second vertical deflection windings;
- a potential source;
- an electron device;
- transformer means having a split primary winding with first and second portions, said first portion coupling said electron device to said potential source and said second portion coupling said electron device to a potential reference level; and
- charge storage means coupling each of said first and second horizontal deflection windings to one of said first and second portions of said transformer means and said electron device whereby said horizontal and vertical deflection circuits are substantially isolated from one another by said charge storage means.

2. The horizontal deflection circuitry of claim 1 wherein said charge storage means is in the form of a first capacitor coupling said first horizontal deflection windings to said electron device and first portion of said primary winding of said transformer means and a second capacitor coupling said second horizontal deflection winding to said electron device and second portion of said primary winding of said transformer means.

3. The horizontal deflection circuitry of claim 1 wherein said electron device has an output electrode coupled to said first portion and an input electrode coupled to said second portion of said primary winding of said transformer means.

4. In a television receiver having a cathode ray tube display, a horizontal deflection circuit comprising:

a cathode ray tube;

deflection yoke means having common winding in a bridge configuration, and horizontal and vertical deflection windings coupled to said common windings;

a potential source;

transformer means having a split primary winding with a first portion coupled to said potential source and a second portion coupled to a potential reference level;

an electron device coupled to said first and second portions of said split primary winding of said transformer means and responsive to an applied signal potential; and charge storage means coupling said electron device and first and second portions of said primary winding to said horizontal deflection windings.

5. The horizontal deflection circuit of claim 4 wherein said horizontal deflection windings include first and second windings and said charge circuit means includes first and second capacitors coupling said first and second windings to said electron device.

6. The horizontal deflection circuit of claim 4 wherein said common windings are in the form of a bridge configuration having a pair of diametrically opposite corners, said horizontal deflection windings include first and second windings coupled to diametrically opposite corners of said bridge configuration and said vertical deflection windings include first and second windings coupled to diametrically opposite corners of said bridge configuration.

* * * * *